2,884,269
PUMP SHAFT HOUSING REPAIR KIT

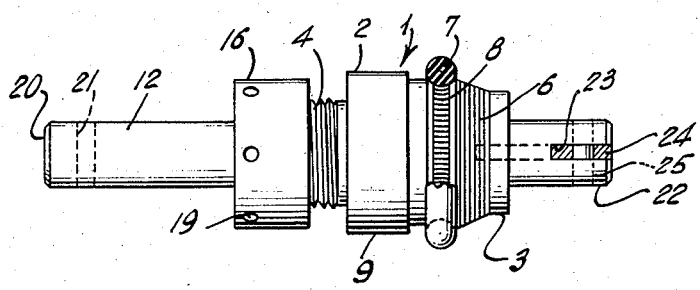
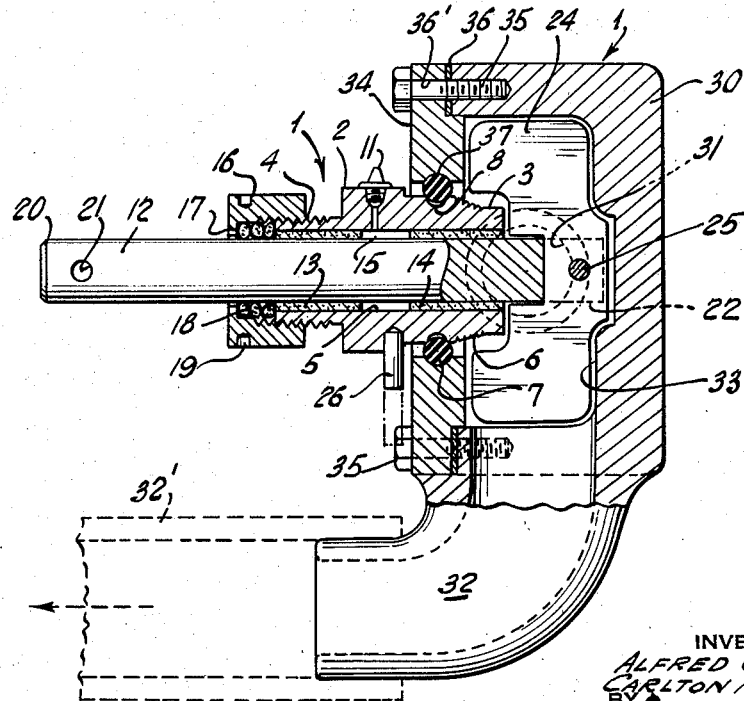

Alfred G. Reinke, Irvington, and Carlton A. Johnson, New Brunswick, N.J., assignors to J and R Specialties, Inc., Hillside, N.J., a corporation of New Jersey Application November 19, 1956, Serial No. 623,009

1 Claim. (Cl. 286—37)

The present invention relates to pumps and particularly to a pump shaft housing repair kit although the construction may also be used in new pump manufacture.

It is an object of the present invention to provide an improved pump shaft housing.

Another object of the invention is to provide a pump shaft housing which is economical in manufacture, efficient in operation, and rugged in use.

Still another object of the invention is to provide a pump shaft housing repair kit which may be used to modify existing pump installations.

In accordance with the invention, the foregoing objects are accomplished by providing a main bushing member adapted to fit in the wall of a pump. The bushing member is provided with a long bearing surface, preferably in spaced parts, and with sealing means to prevent fluid leakage.

Other objects and advantages of the invention will be apparent from the following description and from the accompanying drawings which show, by way of example, an embodiment of the invention.

In the drawings:

Figure 1 is a plan view of the pump shaft and bushing in accordance with the invention, the O-ring gasket being partly broken away to show the serrated groove in which the O-ring is positioned.

Figure 2 is a vertical sectional view corresponding to Figure 1 and additionally illustrates an impellor pump housing in vertical section.

Referring to the drawing, there is shown a pump shaft housing 1 in accordance with the invention and including a main bushing member 2 having a reduced inner end 3 and a threaded outer end 4. The bushing 2 has a shaft passage 5 extending longitudinally therethrough. The bushing inner end 3 is made with a plurality of annular cuts 6 to facilitate the positioning of O-ring 7 in annular groove 8 provided with a serrated surface as shown in Figure 1. The O-ring 7 is normally of a somewhat smaller diameter than that of the base of the groove 8 to assure a leak-proof contact when the O-ring is in position, which is very difficult to insert in position without the aid of the roughened surface provided by the annular cuts 6.

At the central portion thereof as indicated at 9 the bushing 2 is of its greatest diameter and is provided with a threaded passage 10 to receive a conventional grease fitting 11.

While the surface of the shaft passage may provide the journal for a shaft 12, it is preferable that journal means is provided by a pair of longitudinally spaced bearings 13 and 14 which may be of the well-known self-lubricating type, space 15 between the bearings 13 and 14 providing for grease storage. Although the bearings 13 and 14 are of the self-lubricating type, it has been found advantageous to utilize the grease fitting 12 so that the grease may be used as a cleaning agent to wash out any grit or dust which may find its way into the bearings 13 or 14. While the bearings 13 and 14 may be spaced, it is obvious that a continuous single bearing might be used.

In order to provide a leak-proof seal, a packing nut 16 is provided including a packing recess 17 to receive packing material 18. The packing nut 16 is threadedly engaged with the bushing outer end 4 and confines the packing material 18 against the end of the bushing and against the shaft 12. The packing nut is recessed as indicated at 19 to receive a tool to tighten it in position.

At its outer end 20, the shaft 12 is apertured as indicated at 21 to receive any suitable driving coupling for the rotation of the shaft. At its inner end 22 the shaft 12 is longitudinally slitted as indicated at 23 to receive a flat impellor blade 24. Both the shaft 12 and the impellor blade 24 are apertured in alignment to receive a pin 25 which is preferably made of a soft material as brass so that it will shear off to prevent damage in the event a foreign body becomes lodged in the pump.

In order to prevent the main bushing member 2 from turning while the packing nut 16 is tightened, or in the event the packing nut has been made too tight, a stop pin 26 is threadedly engaged in the center portion 9 of the bushing as indicated at 27, the length of the stop pin being made such that it will contact adjacent structure (not shown) and prevent the rotation of the bushing 2.

The construction so far described may be provided as a repair kit assembly for existing pump installations or may be incorporated into a new pump construction.

In Figure 2 there is shown a pump housing 30 such as might be used on an automobile engine for cooling water circulation. The pump housing 30 has an inlet 31 (indicated by dotted lines) and an outlet 32 which may receive a conventional hose 32'. The interior of the pump housing 30 is formed with a chamber 33 to fit the contour of the impellor blade 24. The chamber 33 is closed by a side plate 34 secured in position by lug bolts 35, a gasket 36 providing a seal. The side plate 34 is apertured as indicated at 36', the sidewall being made with a groove 37 to receive the O-ring 7.

It should be noted that the pump shaft housing 1 is secured in position in the side plate 34 solely by engagement of the O-ring 7 in the grooves 8 and 37. In the event the assembly is to be used in a location which does not provide a contact for the stop pin 26, it may be positioned to contact the heads of the bolts 35 or stop means may be provided extending from the surface of the side plate 34.

While the invention has been described and illustrated with reference to a specific embodiment thereof, it will be understood that other embodiments may be resorted to without departing from the invention. Therefore, the form of the invention set out above should be considered as illustrative and not as limiting the scope of the following claim.

We claim:

In a pump shaft housing repair kit for use with a fluid pump having an opening on the side wall thereof, the kit including a main bushing member having a grooved outer surface, an O-ring bushing positioned in the groove and adapted to be inserted in the opening of the side wall of the pump, the main bushing member having a shaft passage therethrough, an impellor shaft extending through the shaft passage, the outer end of the main bushing member made of reduced diameter and having a threaded outer surface, a packing nut engaging the threaded end of the main bushing member and having a packing recess, the packing nut of approximately the same diameter as the main bushing member, and a packing within the recess about the shaft, the packing nut compressing the packing about the shaft and against the end of the main bushing member, the improvement wherein the bushing member has a tapered inner end, the tapered surface terminating at the wall of the groove, the tapered surface formed with a plurality of annular cuts, the O-ring when in unstretched condition smaller in diameter than the bottom diameter of the O-ring groove so that a tight engagement is had between the O-ring and the bottom of its groove, the annular cuts on the tapered surface having facilitated the positioning of the tight fitting O-ring into its groove.

References Cited in the file of this patent

UNITED STATES PATENTS

| | | |
|---|---|---|
| 1,752,006 | Kalb | Mar. 25, 1930 |
| 1,873,146 | Patch | Aug. 23, 1932 |
| 2,263,178 | Lignian et al. | Nov. 18, 1941 |
| 2,496,219 | Kishline | Jan. 31, 1950 |